(12) United States Patent
Lin

(10) Patent No.: US 10,632,550 B2
(45) Date of Patent: Apr. 28, 2020

(54) FOLDABLE MITER SAW

(71) Applicant: REXON INDUSTRIAL CORP., LTD., Taichung (TW)

(72) Inventor: Wei Chen Lin, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 0 days.

(21) Appl. No.: 16/260,184

(22) Filed: Jan. 29, 2019

(65) Prior Publication Data
US 2019/0232398 A1 Aug. 1, 2019

(30) Foreign Application Priority Data
Feb. 1, 2018 (TW) .................................. 107103632

(51) Int. Cl.
| B23D 45/04 | (2006.01) |
|---|---|
| B23D 45/14 | (2006.01) |
| B23D 47/02 | (2006.01) |
| B23D 57/00 | (2006.01) |
| B27B 5/29 | (2006.01) |

(52) U.S. Cl.
CPC ........... *B23D 45/044* (2013.01); *B23D 45/14* (2013.01); *B23D 47/025* (2013.01); *B23D 57/0092* (2013.01); *B27B 5/29* (2013.01)

(58) Field of Classification Search
CPC .... B23D 45/044; B23D 45/14; B23D 47/025; B23D 57/0092; B27B 5/29
See application file for complete search history.

(56) References Cited

U.S. PATENT DOCUMENTS

| 9,925,688 | B2* | 3/2018 | Lin ...................... B27G 19/02 |
|---|---|---|---|
| 2007/0022853 | A1* | 2/2007 | Carroll ................. B23D 45/044 83/34 |
| 2009/0173200 | A1* | 7/2009 | Aoyama ............. B23D 45/048 83/471.3 |

(Continued)

FOREIGN PATENT DOCUMENTS

| CN | 1718339 A | 1/2006 |
|---|---|---|
| TW | 201325776 A1 | 7/2013 |

(Continued)

OTHER PUBLICATIONS

Porter Cable Folder Saw PCXB115MS (Manual published Apr. 2017, https://www.manualslib.com/manual/1295886/Porter-Cable-Pcxb115mms.html?p.=2#manual).*

(Continued)

*Primary Examiner* — Omar Flores Sanchez
(74) *Attorney, Agent, or Firm* — Bacon & Thomas, PLLC

(57) ABSTRACT

A foldable miter saw includes a base unit, a worktable unit rotatably mounted on the base unit and includes an axle block, a cutting unit having a rotatable member axially mounted to the axle block, an adjusting member adjustably mounted on the axle block, and a positioning device mounted on the rotatable member. Rotating the rotatable member relative to the axle block causes the cutting unit to be shifted between a working position where the adjusting member supports the positioning device in position and the end faces of the saw blade are kept perpendicular to the work surface, and a folded position where the adjusting member and the positioning device are separated from each other and one end face of the saw blade approaches the work surface.

5 Claims, 10 Drawing Sheets

(56) References Cited

U.S. PATENT DOCUMENTS

| | | | | |
|---|---|---|---|---|
| 2009/0249933 | A1* | 10/2009 | Kaye, Jr. | B23D 45/044 83/471.3 |
| 2011/0011229 | A1* | 1/2011 | Lawlor | B23D 45/044 83/100 |
| 2012/0160073 | A1* | 6/2012 | Lawlor | B23D 45/044 83/471.3 |
| 2013/0019730 | A1* | 1/2013 | Pierga | B23D 45/044 83/165 |
| 2013/0087034 | A1* | 4/2013 | Aoyama | B23D 45/048 83/471.3 |
| 2014/0202297 | A1* | 7/2014 | Sasaki | B23D 45/044 83/471.3 |
| 2014/0251106 | A1* | 9/2014 | Gehret | B23D 45/044 83/471.3 |
| 2016/0221210 | A1* | 8/2016 | Lin | B27G 19/02 |
| 2016/0263669 | A1* | 9/2016 | Gehret | B23D 45/044 |
| 2016/0279822 | A1* | 9/2016 | Ceroll | B23D 45/044 |
| 2017/0120435 | A1* | 5/2017 | Palich | H02K 7/145 |
| 2017/0189976 | A1* | 7/2017 | Lin | B23D 45/044 |
| 2017/0239737 | A1* | 8/2017 | Lin | B23D 45/04 |
| 2017/0326755 | A1* | 11/2017 | Sheddy | B23D 45/02 |
| 2018/0029146 | A1* | 2/2018 | Hart | B23D 45/044 |
| 2018/0133816 | A1* | 5/2018 | Dutterer | B27B 5/29 |
| 2019/0009425 | A1* | 1/2019 | Sprague | B23D 45/048 |
| 2019/0232399 | A1* | 8/2019 | Lin | B23D 45/044 |
| 2019/0291193 | A1* | 9/2019 | Chang | B23D 45/003 |
| 2019/0321961 | A1* | 10/2019 | Palich | H02K 7/145 |

FOREIGN PATENT DOCUMENTS

| | | |
|---|---|---|
| TW | I577474 B | 4/2017 |
| TW | I586465 B | 6/2017 |
| TW | I586494 B | 6/2017 |
| TW | I593489 B | 8/2017 |
| TW | 201801830 A | 1/2018 |
| TW | 201801831 A | 1/2018 |

OTHER PUBLICATIONS

Taiwanese Office Action in corresponding Taiwanese Application No. 107103632, dated Aug. 27, 2018.

* cited by examiner

FOLDABLE MITER SAW

BACKGROUND OF THE INVENTION

1. Field of the Invention

The present invention relates to miter saw technology and more particularly, to a foldable miter saw.

2. Description of the Related Art

There is a miter saw (the prior art of the patent application of the Taiwan Publication No. 201325776), comprising a base unit, a worktable rotatable relative to the base unit, a cutting unit coupled to one side of the worktable, and a positioning unit. The base unit has a base and two feet respectively fixed on both sides of the base. The positioning unit has a screw rod screwed on the worktable. When the sawing angle of the cutting unit is to be adjusted, the operator must loosen the screw rod, and use the worktable to drive the cutting unit to rotate relative to the base unit. When the cutting unit is turned to the desired angle, the screw rod is tightened again.

The above miter saw has an operational functionality of adjusting the sawing angle. However, when the miter saw is temporarily not used and needs to be temporarily stored, the overall assembled state is bulky and takes up a large space. Further, when the miter saw is manufactured and is intended to be packed and transported, if it is packaged in an assembled state, it will increase the volume necessary for shipping and the handling cost.

In order to solve the above problems, the applicant has invented TW certificate number 1593489, 1586465, 1586494, 1577474, these disclosures allow the miter saw to be stored in smaller volumes according to demand.

However, in the case of a foldable miter saw, a cutting unit is converted between a working position and a folded position with respect to a base unit. When the cutting unit is operated to the working position relative to the base unit, the contained angle between the saw blade and the work surface of the worktable must be controlled at 90 degrees, otherwise the accuracy of the workpiece end face may be out of alignment.

SUMMARY OF THE INVENTION

The present invention has been developed in view of the above circumstances. It is one of the main objects of the present invention to provide a foldable miter saw, which can precisely control the contained angle between the saw blade and the work surface.

To achieve this and other objects of the present invention, a foldable miter saw comprises a base unit, a worktable unit, a cutting unit, an adjusting member and a positioning device. The base unit comprises a front side, a rear side opposite to the front side and a top surface extended from the front side to the rear side. The worktable unit is rotatably mounted on the base unit, comprising a work surface corresponding to the top surface and an axle block corresponding to the rear side and connected to the work surface. The axle block defines an axis that extends from the rear side toward the front side in a parallel manner relative to the work surface. The cutting unit comprises a rotatable member axially mounted to the axle block and rotatable on the axis relative to the worktable unit, a supporting arm pivotally connected to the rotatable member, a saw blade mounted in the supporting arm and a driving member mounted on the supporting arm and adapted for rotating the saw blade. The saw blade defines two opposing end faces. The adjusting member is adjustably mounted on one of the axle block and the rotatable member. The positioning device is mounted on the other of the axle block and the rotatable member. When the rotatable member of the cutting unit is rotated relative to the axle block of the worktable unit, the cutting unit is shifted between a working position where the adjusting member supports the positioning device in the working position and the end faces of the saw blade are kept perpendicular to the work surface, and a folded position where the adjusting member and the positioning device are separated from each other and one end face of the saw blade approaches the work surface.

The effect of the present invention is that when the cutting unit is shifted to the working position by using the adjusting member to be incorporated with the positioning device, the adjusting member provides support to the positioning device for positioning, and the end faces of the saw blade are accurately controlled to be perpendicular to the work surface, thereby achieving the purpose of precise sawing.

Other advantages and features of the present invention will be fully understood by reference to the following specification in conjunction with the accompanying drawings, in which like reference signs denote like components of structure.

DETAILED DESCRIPTION OF THE INVENTION

Figure 1:
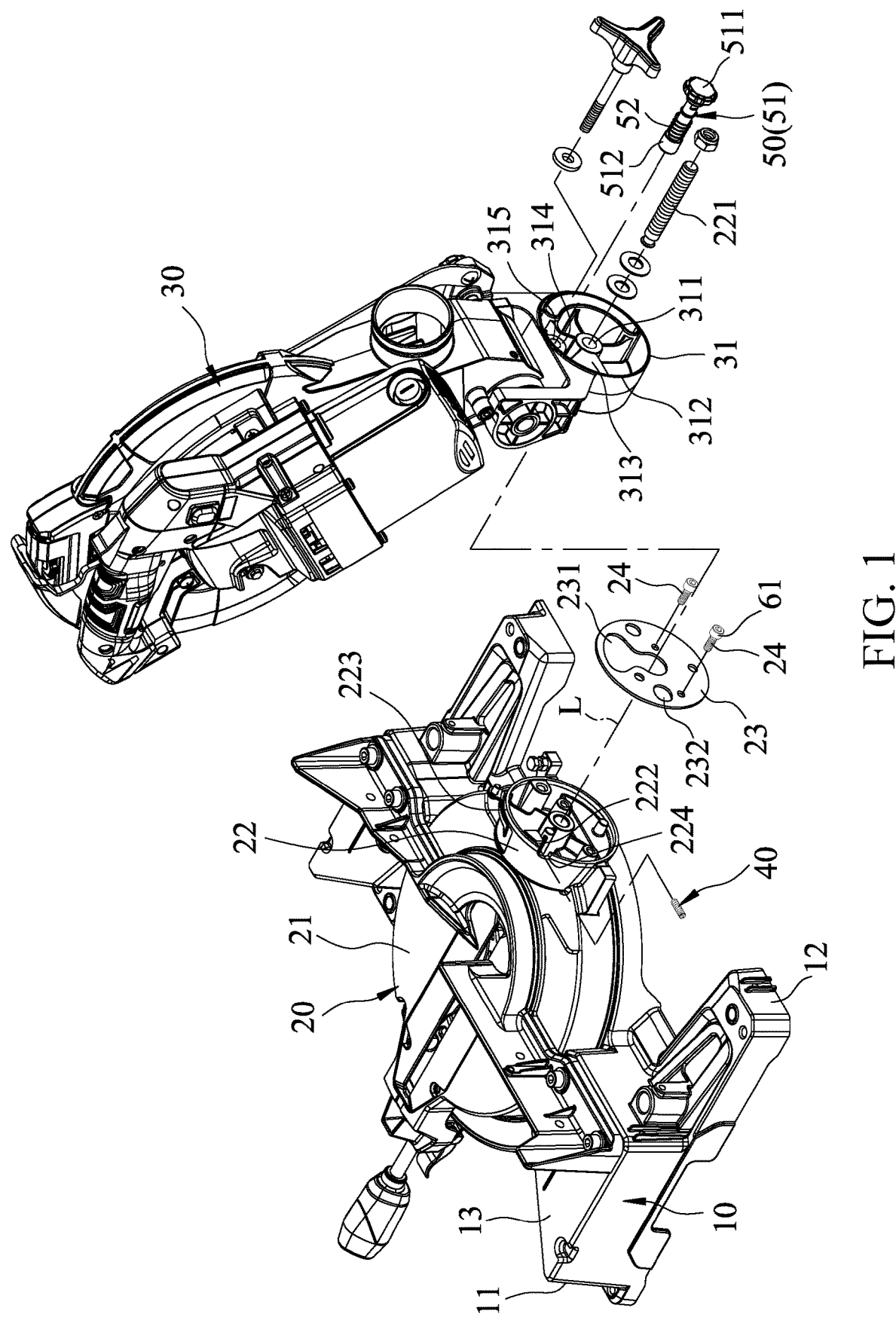
FIG. 1 is an exploded view of a foldable miter saw in accordance with the present invention.
Figure 2:
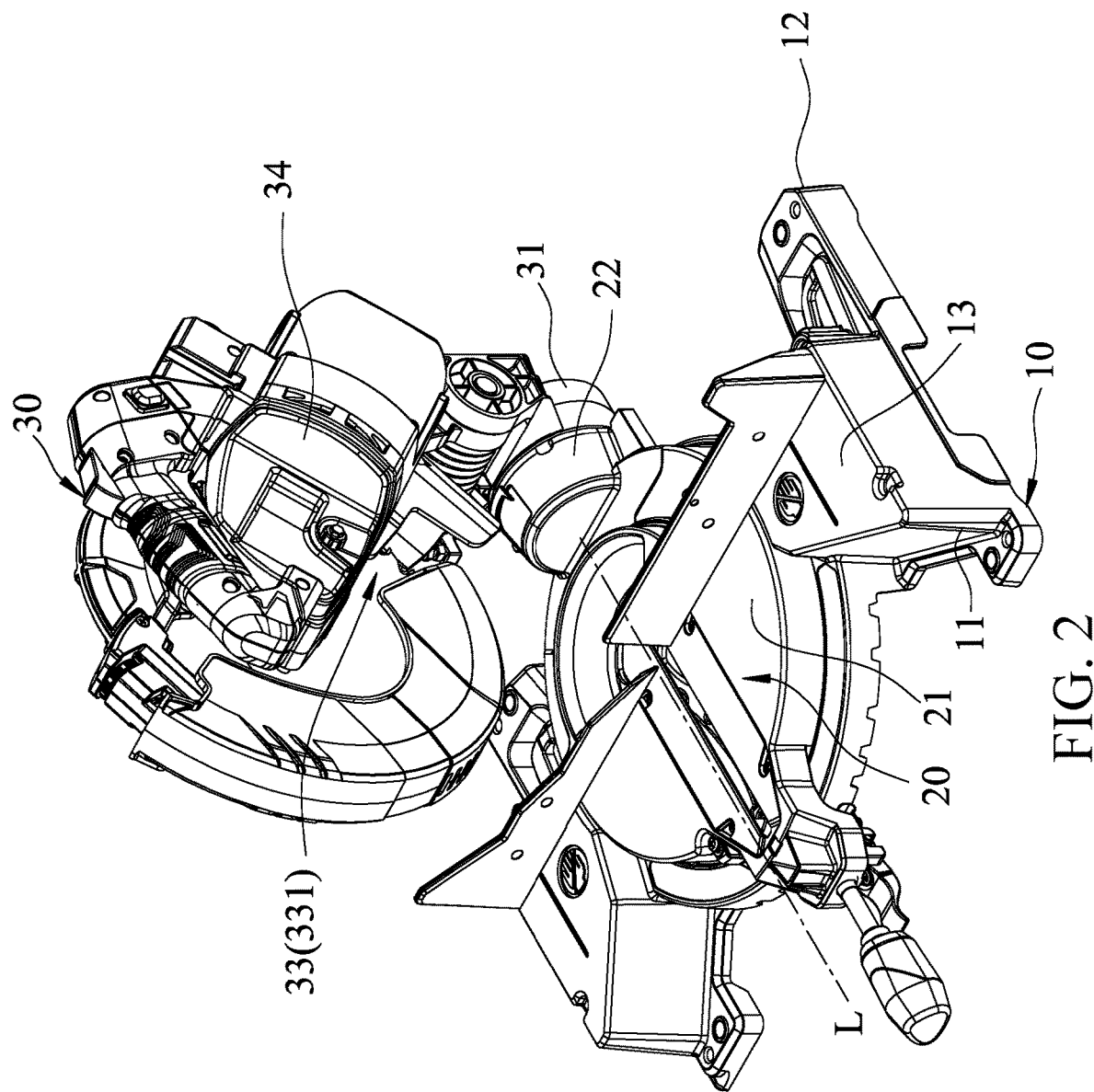
FIG. 2 is an oblique top elevational view of the present invention, illustrating the cutting unit of the foldable miter saw in the working position.
Figure 3:
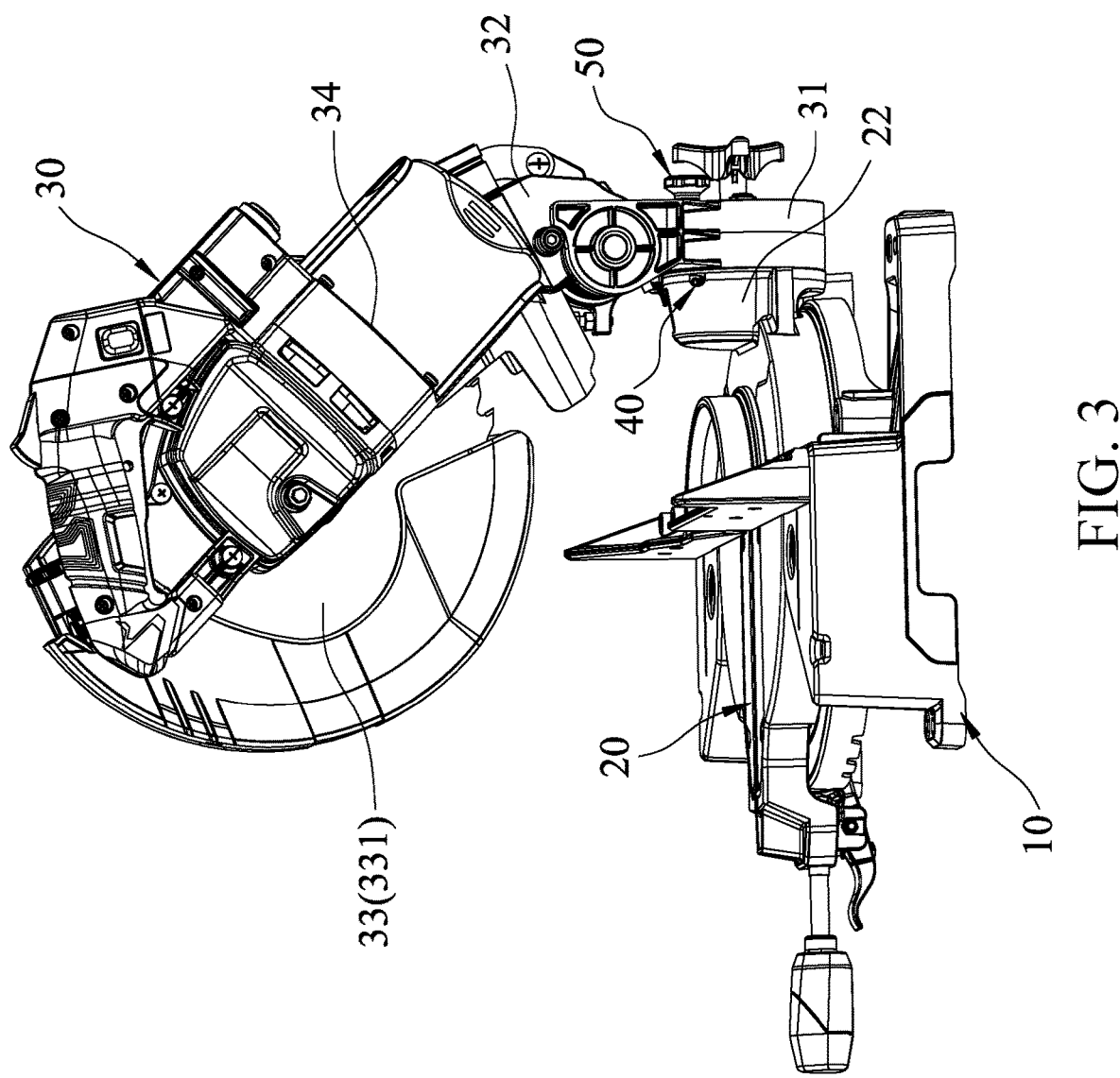
FIG. 3 corresponds to FIG. 2 when viewed from another angle.

Referring to FIGS. 1 and 2, a foldable miter saw in accordance with the present invention is shown. The foldable miter saw comprises a base unit 10, a worktable unit 20, a cutting unit 30, an adjusting member 40, and a positioning device 50.

The base unit 10 has a front side 11, a rear side 12 opposite to the front side 11, and a top surface 13 extended from the front side 11 to the rear side 12.

The worktable unit 20 is rotatably mounted on the base unit 10, comprising a work surface 21 corresponding to the top surface 13 of the base unit 10, an axle block 22 corresponding to the rear side 12 and connected to the work surface 21, two screw bolts 24, and a position-limiting plate 23 affixed to the axle block 22 by the two screw bolts 24. The axle block 22 defines an axis L that extends from the rear side 12 toward the front side 11 in a parallel manner relative to the work surface 21, a revolving axle 221 set along the axis L, and a screw hole 222 disposed at one side of the axis L and perpendicular to the axis L. The position-limiting plate 23 has a sliding slot 231 surrounding the axis L, and a positioning hole 232 spaced from the sliding slot 231 at one side. The axle block 22 further has a ring wall 223 surrounding the revolving axle 221, and a through hole 224 disposed in the ring wall 223 and connectable to the screw hole 222.

The cutting unit 30 comprises a rotatable member 31 axially mounted to the axle block 22, a supporting arm 32 pivotally connected to the rotatable member 31, a saw blade 33 mounted in the supporting arm 32, and a driving member 34 mounted on the supporting arm 32 and adapted for rotating the saw blade 33, such as a motor. The rotatable member 31 can be rotated to turn the supporting arm 32 about the axis L relative to the base unit 10 and the worktable unit 20. The rotatable member 31 comprises an axle tube 311 axially coupled to the revolving axle 221, a surrounding wall 312 disposed around the axle tube 311, a spoke portion 313 connected between the axle tube 311 and the surrounding wall 312, and a sleeve 314 disposed between the axle tube 311 and the surrounding wall 312 and in parallel to the axle tube 311 and defining therein a sleeve hole 315. The saw blade 33 defines two opposing end faces 331.

The adjusting member 40 is adjustably mounted to the axle block 22. In this embodiment, the adjusting member 40 is an adjustment screw threaded into the screw hole 222.

Figure 4:
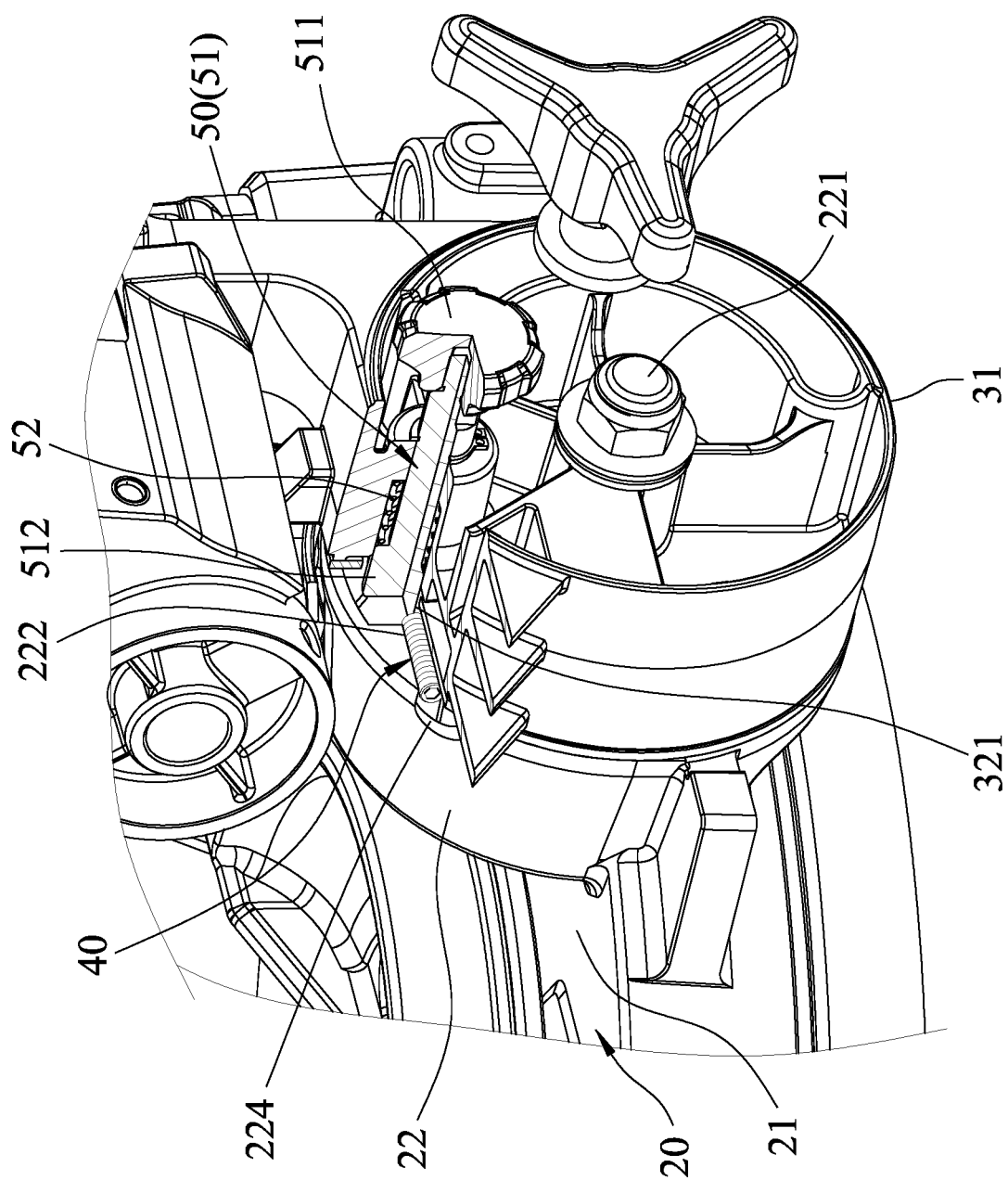
FIG. 4 is a schematic sectional elevation, in an enlarged scale, of a part of FIG. 2.
Figure 5:
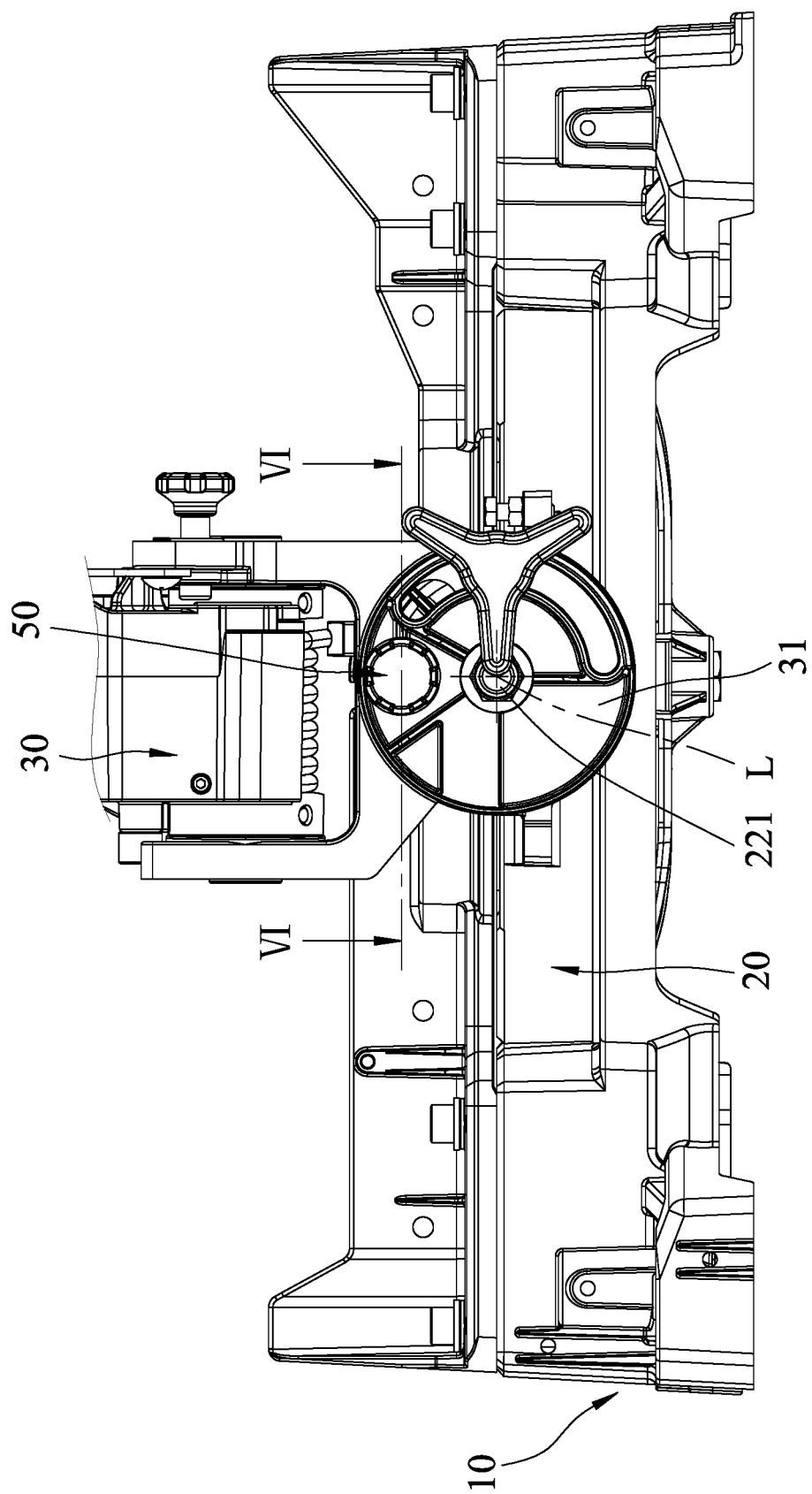
FIG. 5 is a schematic rear plain view, in an enlarged scale, of a part of FIG. 2.
Figure 6:
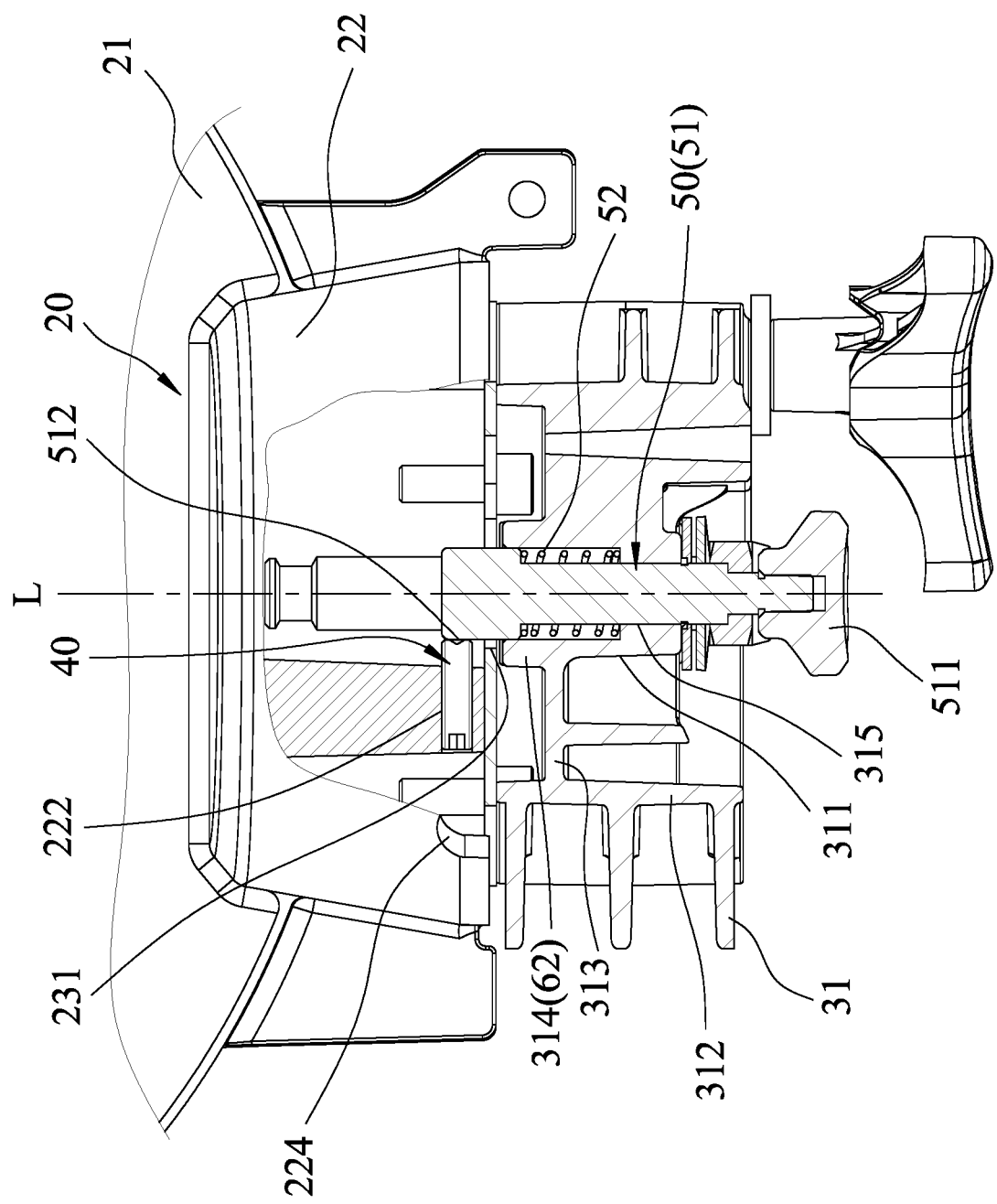
FIG. 6 is a sectional view taken along line VI-VI of FIG. 5, illustrating the positioning pin in the locking position relative to the axle block.
Figure 7:
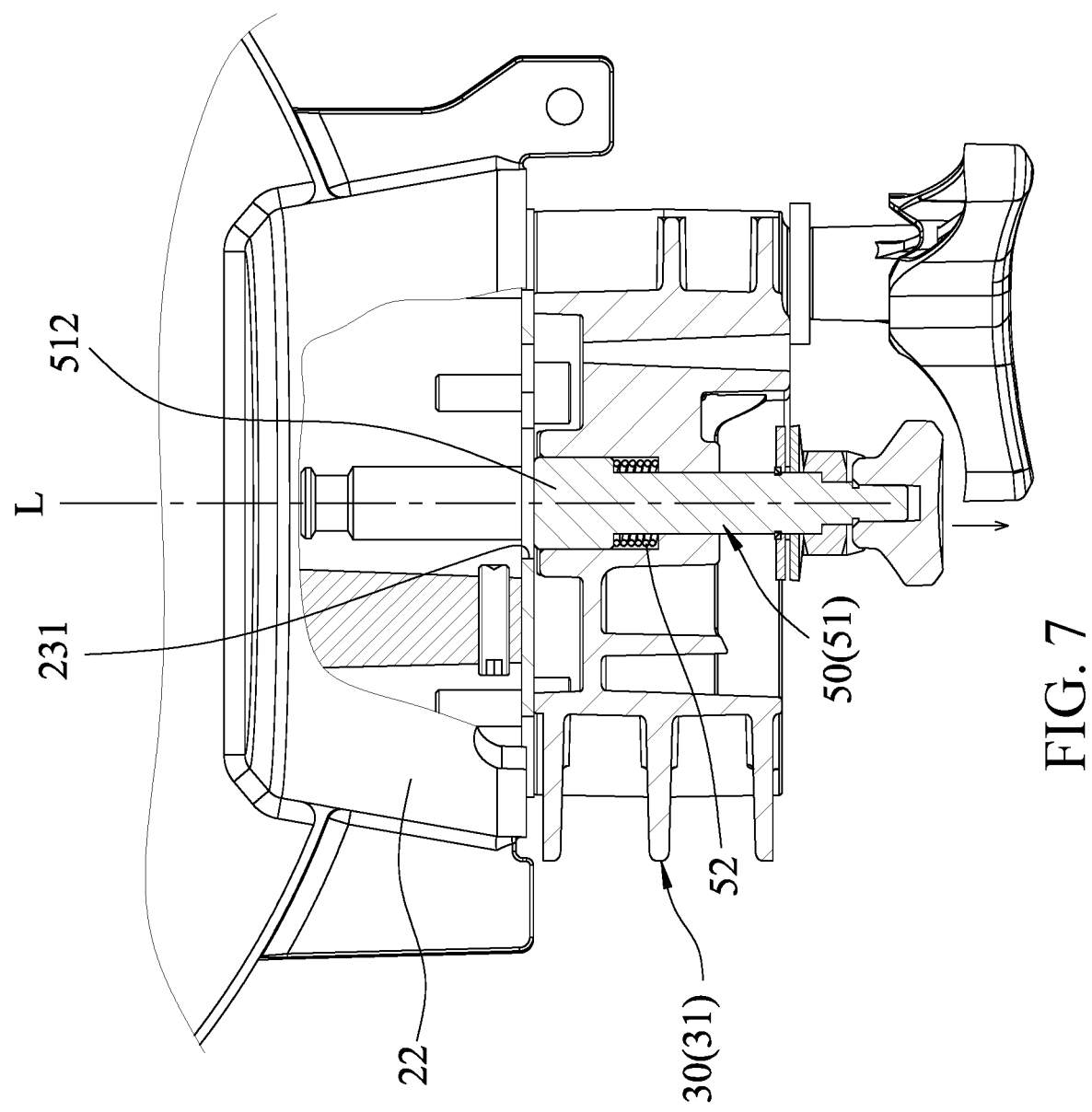
FIG. 7 is similar to FIG. 6, illustrating the positioning pin moved relative to the axle block from the locking position to the unlocking position.

The positioning device 50 is mounted in the rotatable member 31, comprising a positioning pin 51, which is inserted into the sleeve hole 315, and an elastic member 52 mounted between the positioning pin 51 and the spoke portion 313 of the rotatable member 31. The positioning pin 51 has a pull end 511 protruding from the outside of the rotatable member 31, and an engagement end 512 opposite to the pull end 511. The pull end 511 can be pulled to move the engagement end 512 between a locking position where the engagement end 512 is engaged into the sliding slot 231 or the positioning hole 232 (see FIGS. 4 and 6), and an unlocking position where the engagement end 512 is moved out of the sliding slot 231 or the positioning hole 232 (see FIG. 7). The elastic member 52 in this embodiment is a compression spring that imparts a pressure to force the positioning pin 51 into the sliding slot 231 or the positioning hole 232.

The foldable miter saw further comprises a supporting portion 61 located on the axle block 22, and a bearing portion 62 located on the rotatable member 31. In this embodiment, the supporting portion 61 is the head of one screw bolt 24, and the bearing portion 62 is the sleeve 314 of the rotatable member 31.

FIGS. 2-5 show the cutting unit of the foldable miter saw described above in a working position. At this time, the positioning device 50 is engaged into the sliding slot 231 in the locking position; the adjusting member 40 gives support to the engagement end 512 of the positioning device 50 in the working position to keep the end faces 331 of the saw blade 33 perpendicular to the work surface 21. Generally, the adjusting member 40 is accurately adjusted when the foldable miter saw is shipped from the factory, but after a period of use, the adjusting member 40 and the positioning device 50 may be relatively worn due to improper operation, causing the end faces 331 of the saw blade 33 to not be perpendicular to the work surface 21. In this case, the user can insert a hex wrench into the through hole 224 to rotate the adjusting member 40 to align the end faces 331 of the saw blade 33 to the work surface 21, thereby achieving calibration and ensuring the sawing precision of the saw blade 33.

When the foldable miter saw is temporarily not used and is intended to be stored or intended to be packaged, the operator can operate the worktable unit 20 to drive the cutting unit 30 to rotate to the left side of FIG. 2 relative to the base unit 10. Then, the operator can pull the pull end 511 of the positioning device 50 to move the engagement end 512 from the locking position in the sliding slot 231 (see FIGS. 4 and 6) to the unlocking position out of the sliding slot 231 (see FIG. 7 where the elastic member 52 is compressed to store the elastic restoring energy). Then, the operator can turn the cutting unit 30 about the axis L. Thus, the rotatable member 31 is rotated relative to the axle block 22, and the positioning device 50 is separated from the adjusting member 40 to the extent where one end face 331 of the saw blade 33 approaches the work surface 21. Thus, the cutting unit 30 is set in the folded position. At this time, the operator can release the pressure from the pull end 511 of the positioning device 50, enabling the engagement end 512 to be forced into the positioning hole 232 in the locking position by the elastic restoring energy of the elastic member 52 (see FIGS. 8, 9 and 10).

Figure 8:
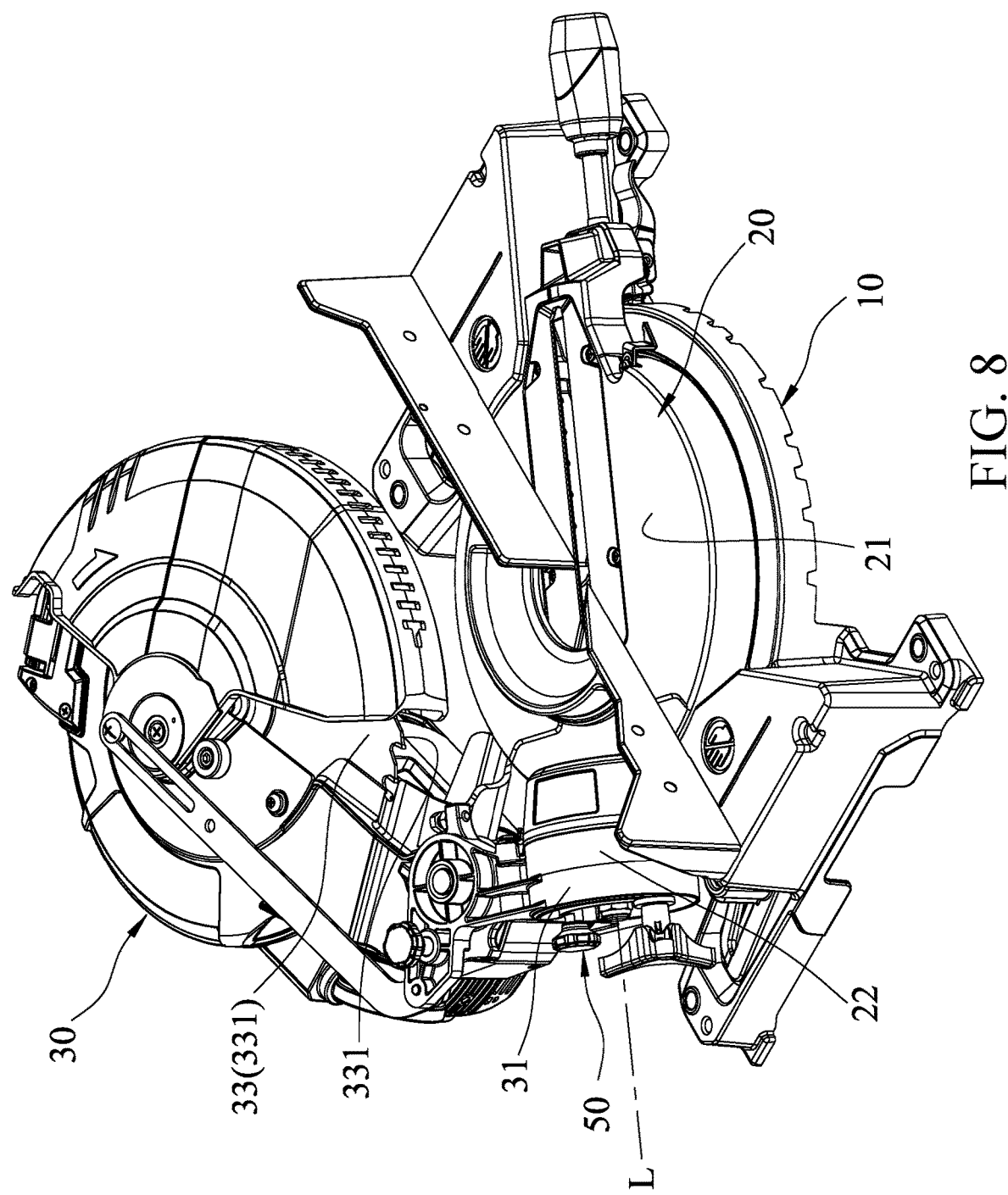
FIG. 8 is an oblique top elevation of the present invention, illustrating the cutting unit set in the folded position.
Figure 9:
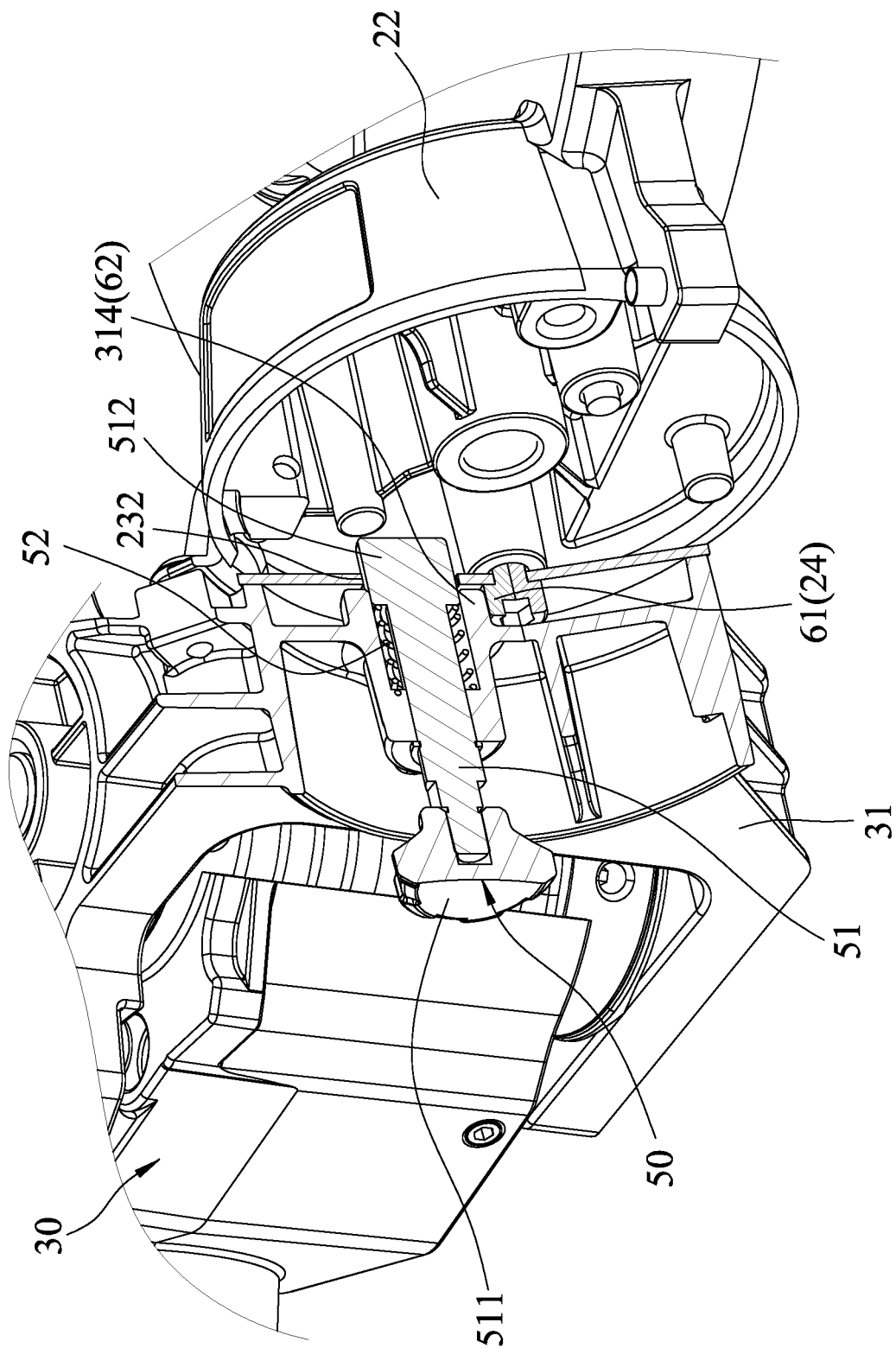
FIG. 9 is a schematic sectional elevational view, in an enlarged scale, of a part of FIG. 8.
Figure 10:
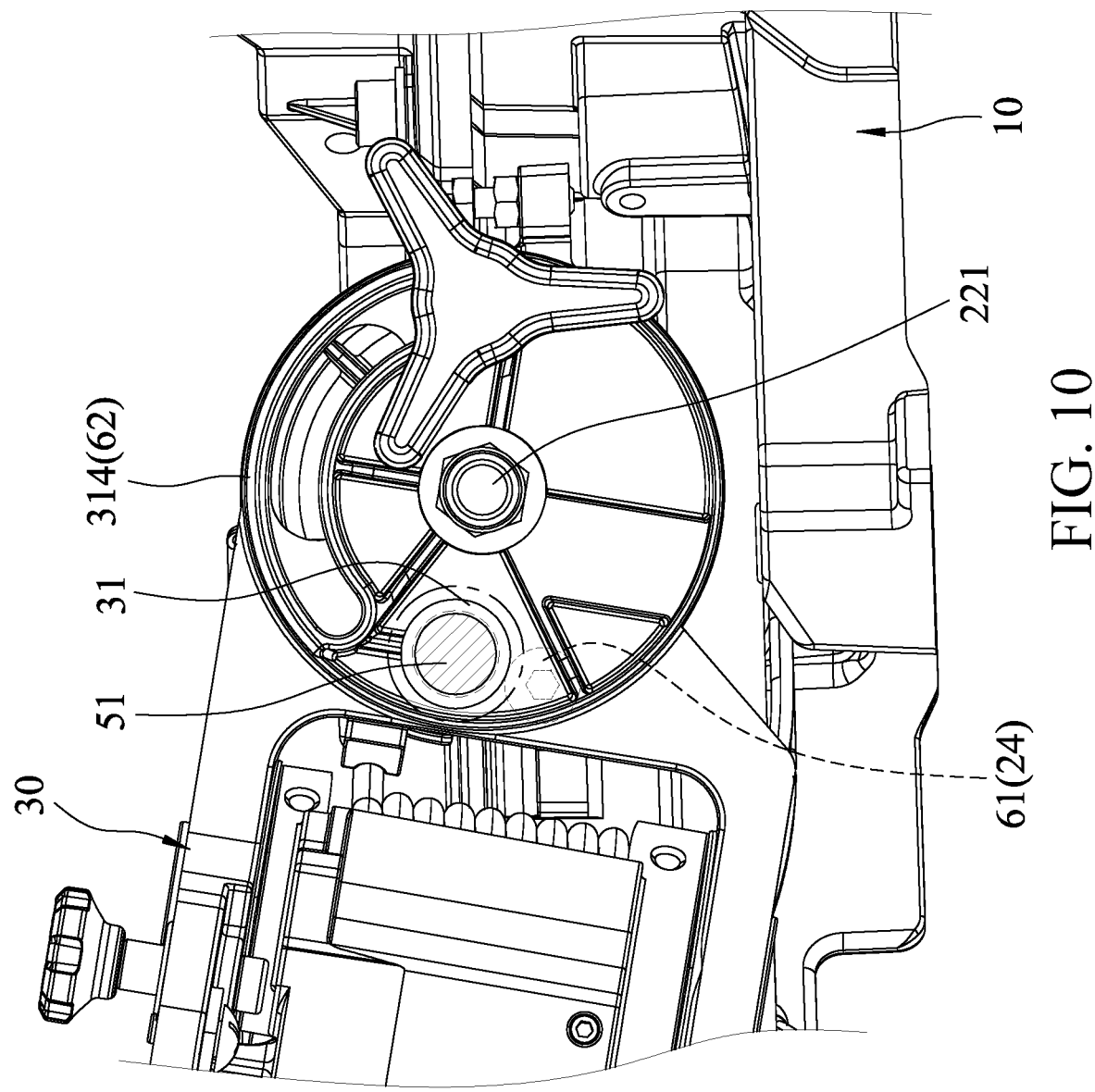
FIG. 10 is a schematic rear plain view, in an enlarged scale, of a part of FIG. 8.

As illustrated in FIGS. 8, 9 and 10, when the cutting unit 30 is in the folded position, the weight of the cutting unit 30 is rested on the supporting portion 61 (screw bolt 24) via the bearing portion 62 (the sleeve 314), avoiding generation of a large friction force to stop the positioning pin 51 from smooth movement due to a shear force caused between the engagement end 512 and the positioning hole 232 by the weight of the cutting unit 30.

Therefore, the present invention can achieve precise control of the end faces 331 of the saw blade 33 perpendicular to the work surface 21 by using the adjusting member 40 and the positioning device 50, thereby ensuring precise sawing. Moreover, by the action of the bearing portion 62 against the supporting portion 61, the cutting unit 30 can be positively supported when the cutting unit 30 is folded, preventing the positioning pin 51 from being stuck due to the load, and allowing the cutting unit 30 to be smoothly biased from the folded position to the working position.

It should be noted that, in this embodiment, the positioning device 50 is a component generated by rotating the rotatable member relative to the axle block 22, and the supporting portion 61 is the head of one screw bolt 24 that fastens the position-limiting plate 23 to the axle block 22. Thus, it can achieve the effect of resisting positioning with no need to set up other components, which can simplify the number of components and reduce manufacturing costs.

In summary, the foldable miter saw of the present invention has a simple overall structure and is easy to manufacture, so that the object of the present invention can be achieved.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A foldable miter saw, comprising:

a base unit comprising a front side, a rear side opposite to said front side and a top surface extended from said front side to said rear side;

a worktable unit rotatably mounted on said base unit, said worktable unit comprising a work surface that corresponds to said top surface and an axle block positioned at said rear side and connected to said work surface, said axle block defining an axis that extends from said rear side toward said front side in a parallel manner relative to said work surface;

a cutting unit comprising a rotatable member axially mounted to said axle block and rotatable about said axis relative to said worktable unit, a supporting arm pivotally connected to said rotatable member, a saw blade mounted to said supporting arm and a driving member mounted on said supporting arm and adapted for rotating said saw blade, said saw blade defining two opposing end faces; a supporting portion located on one of the said axle block and said rotatable member and a bearing portion located on the other of said axle block and said rotatable member, said bearing portion having said positioning device therein and being positioned on said supporting portion when said cutting unit is in a folded position;

an adjusting member adjustably mounted on one of said axle block and said rotatable member; and a positioning device mounted on the other of said axle block and said rotatable member;

wherein the foldable miter saw is configured so that when said rotatable member of said cutting unit is rotated relative to said axle block of said worktable unit, said cutting unit is shifted between a working position where said adjusting member supports said positioning device in the working position and said end faces of said saw blade are kept perpendicular to said work surface, and a folded position where said adjusting member and said positioning device are separated from each other and one said end face of said saw blade is folded toward said work surface.

2. The foldable miter saw as claimed in claim 1, wherein said positioning device comprises a positioning pin operably mounted to the other of said axle block and said rotatable member, said positioning device being operable to shift said cutting unit between said working position and said folded position, said positioning device holding said rotatable member in position relative to said axle block and said adjusting member supporting said positioning pin when said cutting unit is in said working position, said cutting unit being shiftable to said folded position when said positioning pin is operated and separated from one of said rotatable member and said axle block.

3. The foldable miter saw as claimed in claim 2, wherein said adjusting member is mounted on said axle block; said positioning device is mounted on said rotatable member, comprising the positioning pin and an elastic member mounted between said positioning pin and said rotatable member, said positioning pin being movable relative to said axle block between a locking position and an unlocking position, said elastic member imparting a force to said positioning pin to engage with said axle block.

4. The foldable miter saw as claimed in claim 3, wherein said axle block of said worktable unit comprises a screw hole disposed perpendicular to said axis; said adjusting member being a screw threaded into said screw hole.

5. The foldable miter saw as claimed in claim 1, wherein said supporting portion is a screw bolt fastened to said axle block; said bearing portion is a sleeve located on said rotatable member and defines therein a sleeve hole for the insertion of said positioning device.

* * * * *